United States Patent [19]

Paar

[11] Patent Number: 4,777,225

[45] Date of Patent: Oct. 11, 1988

[54] SELF-CROSSLINKING CATIONIC PAINT BINDERS AND PROCESS FOR PRODUCING THE BINDERS

[75] Inventor: Willibald Paar, Graz, Austria

[73] Assignee: Vianova Kunstharz, A.G., Werndorf, Austria

[21] Appl. No.: 117,824

[22] Filed: Nov. 9, 1987

[30] Foreign Application Priority Data

Nov. 7, 1986 [AT] Austria ............................ 2969/86

[51] Int. Cl.$^4$ ..................... C08G 8/28; C08G 8/20
[52] U.S. Cl. ........................... 525/490; 525/528; 523/415; 523/416; 524/901
[58] Field of Search ........................ 525/490, 528

[56] References Cited

U.S. PATENT DOCUMENTS

| | | | |
|---|---|---|---|
| 4,134,932 | 1/1979 | Kempter et al. | 525/528 |
| 4,393,179 | 7/1983 | Hoppe et al. | 525/490 |
| 4,568,709 | 2/1986 | Paar et al. | 523/416 |
| 4,711,934 | 12/1987 | Paar et al. | 524/901 |
| 4,711,937 | 12/1987 | Parr | 525/528 |
| 4,721,758 | 1/1988 | Schupp et al. | 525/490 |

*Primary Examiner*—Allan M. Lieberman
*Assistant Examiner*—Robert E. L. Sellers, II
*Attorney, Agent, or Firm*—A. W. Breiner

[57] ABSTRACT

A process for producing self-crosslinking paint binders, water-soluble on protonation, based on the reaction product of aminoalkylation product carrying blocked isocyanate groups, NH-functional compounds, particularly of adducts of primary amines to diepoxy resins, and formaldehyde is described. The products produced according to the process are particularly suited for the formulation of high quality electrodeposition paints.

10 Claims, No Drawings

SELF-CROSSLINKING CATIONIC PAINT BINDERS AND PROCESS FOR PRODUCING THE BINDERS

FIELD OF INVENTION

The invention is directed to self-crosslinking paint binders which are water-soluble on protonation and to a process for producing the binders. More particularly, the invention relates to self-crosslinking paint binders which are based on reaction products of aminoalkylation products carrying blocked isocyanates, phenols and NH-functional compounds, particularly of adducts of primary amines to diepoxy resins. The products produced according to the present invention are particularly suited for the formulation of highquality electrodeposition paints.

BACKGROUND OF INVENTION

EP-A2 No. 0209857, corresponding to U.S. Ser. No. 887,934 filed July 22, 1986, now U.S. Pat. No. 4,711,934, discloses cationic paint binders having the schematic structure

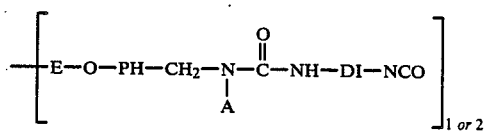

wherein
 E—is the radical of an epoxy resin,
 PH—is the radical of a phenol,
 A—is the radical of an amine and
 DI—NCO is the radical of a semi-blocked diisocyanate.

These binders can be produced in a surprisingly uncomplicated manner and, upon protonation, give water-dilutable paints with good applicational properties and fully crosslinked films at a stoving temperature as low as about 160° C. However, it has been determined that coatings produced with the binders do not meet certain stringent requirements, particularly those required by the automobile industry with regard to various corrosion tests such as salt spray resistance and the so-called scab-test.

It has now been found that condensates of the type described in the above patent, prior to the reaction with the epoxy resin, can be linked in a controllable manner through basic NH-functional compounds and formaldehyde. Because of this controlled linking, the corrosion protection of the paints formulated therewith can be considerably enhanced, in particular if the linking is effected through NH-functional epoxy resin amine adducts.

GENERAL DESCRIPTION OF INVENTION

The present invention is directed to a process for producing self-crosslinking cationic paint binders, water-dilutable upon protonation, which are based on aminoalkylation products carrying blocked isocyanate groups, of phenols and epoxy resins, characterized in that a condensate of the formula

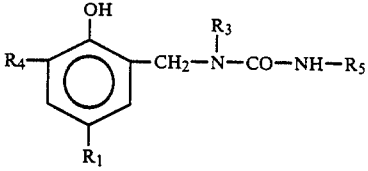

wherein
$R_1$ is a hydrogen atom, an alkyl radical, a radical

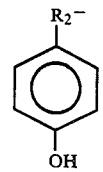

or a radical

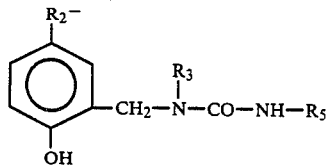

or

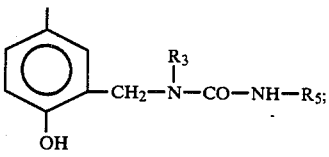

$R_2$ is a radical —$CH_2$—, or

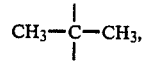

$R_3$ is an alkyl, hydroxyalkyl or tert.-aminoalkyl radical,
$R_4$ is a hydrogen atom, or, where $R_1$ is H, is hydrogen or a radical —$CH_2$—$N(R_3)$—CO—NH—$R_5$ and $R_5$ is the radical or moiety of a diisocyanate, semi-blocked with a monofunctional compound,
is reacted at from 80° to 130° C. with from 0.3 to 1.0 moles of formaldehyde, calculated on the formaldehyde-reactive sites on the phenol nuclei of the condensate, preferably in the form of paraformaldehyde, and with a compound carrying at least one, preferably 2 NH-groups, whereby a quantity of NH-groups is used which is equivalent to the molar quantity of formaldehyde; and in a further reaction step, the phenolic hydroxy groups are partially or totally reacted with epoxy compounds, the quantity of basic groups being chosen such that the final product has an amine value of at least 25 mg KOH/g.

The invention is further concerned with the cationic binders prepared according to the presently disclosed process and their use in water-dilutable paints, particularly electrodeposition paints.

The phenol-urea condensates used as intermediate products are fully described in EP-A2 No. 0209857, corresponding to U.S. Ser. No. 887,934 filed July 22, 1986, with that disclosure being expressly incorporated herein by reference. As disclosed therein, in the preparation of these compounds it is possible to start with an aminoalkylation product of phenol, a primary amine and formaldehyde, and react the product at the NH-group with a semi-blocked diisocyanate, or the condensation of the phenol can be carried out with the reaction product of the semi-blocked diisocyanate and the primary amine.

The preparation of aminoalkylation products of phenols which, after modification, can also serve as a starting material for the present invention, is disclosed in U.S. Pat. No. 4,568,709.

The group of condensation compounds preferred for the present invention, uses as the starting materials dinuclear phenols of the type of diphenylolalkanes, such as bisphenol-A (4,4'-diphenylolpropane) or bisphenol-F (4,4'-diphenylolmethane). The formaldehyde is preferably used as paraformaldehyde with a $CH_2O$-content of about 85 to 100%. Suitable primary aliphatic amines are primary monoamines, such as butylamine, their isomers and higher homologues; primary alkanolamines, such as monoethanolamine and its homologues; and primary-tertiary diamines, especially N,N-dialkylaminoalkylenediamines, such as N,N-dimethylaminoethylamine or N,N-diethylaminopropylamine which are particularly preferred. Diprimary amines such as ethylenediamine and its homologues may be coemployed.

In a particular preferred embodiment, the condensation is carried out in order that the components are heated in the presence of an azeotropic solvent, such as toluol or a corresponding aliphatic hydrocarbon, to the temperature necessary for the azeotropic entrainment of the reaction water, taking into account an eventual exothermic reaction. After removal of the calculated quantity of water, the solvent is vacuum-stripped and the reaction product is dissolved in an aprotic solvent. The thus obtained reaction product, carrying in the molecule an average of at least one secondary amino group, is reacted in a further step at 30° to 50° C. with a semi-blocked diisocyanate, whereby for each NH-group one mole of the isocyanate compound is reacted. Through the reaction of the NH-groups with the semi-blocked diisocyanates, the desired urea groups form. Hydroxy groups which may be present, because of the preferential reaction between NH- and NCO-groups, react to a negligible degree only.

The semi-blocked diisocyanates are prepared in known manner. The preferred diisocyanates are those with different reactivity of the NCO-groups, such as toluylene diisocyanate or isophorone diisocyanate. The preferred blocking agents are aliphatic monoalcohols which—optionally in the presence of normal catalysts—are split off under stoving conditions. Examples of other blocking agents are phenols, oximes, amines, unsaturated alcohols, caprolactame, etc.

The linking of the condensation products with the secondary amino groups is by an aminoalkylation reaction with the aid of formaldehyde, at from 80° to 130° C. with azeotropic removal of the formed reaction water. Suitable NH-compounds are simple disecondary amines, N,N'-dialkylalkylenediamines or N,N'-dialkylpolyalkylenediamines. Preferred compounds are the higher molecular weight compounds, such as the reaction products of di- or polyepoxy compounds with primary amines, particularly with primary-tertiary alkylenediamines.

Optionally, in a last reaction step, the phenolic hydroxy groups can be reacted through etherification with epoxy compounds, preferably monoepoxy compounds, such as the glycidyl esters, particularly those of the so-called KOCH-acids, or glycidyl ethers, such as 2-ethylhexylglycidylether. When using polyepoxy compounds, the high functionality has to be taken into consideration. Normally these compounds are used in subordinate or minor quantities in mixture with monoepoxy compounds. The reaction is carried out at from 80° to 130° C. to an epoxy value of practically zero. Because of the basic groups in the molecule, no additional catalyst is normally necessary.

In the formulation of the batches care should be taken that the final products have the necessary basicity to ensure a sufficient stability of the aqueous solution of the binder. The introduction of the basicity, preferably stemming from tertiary amino groups, according to an amine value of at least 25 mg KOH/g, is effected either through the use of primary-tertiary diamines in the preparation of the condensation compound, or through the use of adequate amines as blocking agents for the semi-blocking of the diisocyanates, or through appropriate selection of raw materials for the NH-group carrying component.

In order to obtain the water-dilutability, the basic groups of the reaction product are partially or totally neutralized with acids, preferably formic acid, acetic acid or lactic acid. For obtaining a dilutability suitable for practical use, normally a neutralization of from 20 to 60% of the basic groups or a quantity of about 20 to 60 milliMoles of acid per 100 g of resin solids is sufficient. The binders are diluted with deionized water to the desired concentration. Optionally they are processed to pigmented paints, prior to neutralization or dilution or in partly diluted state together with crosslinking catalysts, pigments, extenders, and other additives.

The formulation and processing of such paints for the electrodeposition process are known to one skilled in the art and are described in the literature. When used as primers, the deposited coatings are cured at from 150° to 170° C. for 10 to 30 minutes. Should the binders not contain sufficient self-crosslinking structures, additional crosslinkers may be employed, such as blocked isocyanates, amino resins or phenolic resins. With suitable modifications to the formulation, the products may be applied by other methods such as dipping, roller coating, or spraying. Optionally, the binders can be processed with organic solvents.

PRESENTLY PREFERRED EMBODIMENTS

The following examples are to illustrate the invention without limiting its scope. It is again noted that many of the products disclosed in U.S. Pat. No. 4,568,709 and U.S. Ser. No. 887,934 filed July 22, 1986, commonly assigned, can be used to advantage as intermediate products, only considering the functionality of the components.

These intermediate products are designated as component (A) in the examples. Component (B) is the NH-group carrying component.

Parts and percentages are by weight, unless otherwise stated. The molar ratios are given in grams.

EXAMPLE 1

(a) Component (A)

In a suitable reaction vessel 228 parts (1 mole) bisphenol-A are reacted with 204 parts (2 moles) dimethylaminopropylamine and 66 parts (2 mole) paraformaldehyde (91% $CH_2O$) at from 40° to 60° C. for 30 minutes with occasional cooling. After addition of 480 parts toluol, the batch is heated to distillation temperature and the reaction water is removed azeotropically. As soon as the calculated quantity of water has been removed, the batch is cooled to 50° C. At a maximum of 60° C., while cooling, 664 parts (2 moles) of a toluylene diisocyanate, semi-blocked with isodecyl alcohol, are added continuously. The temperature of 60° C. is held until an NCO-value of practically zero is attained.

(b) Component (B)

950 parts (1 mole) of a diepoxy resin based on bisphenol-A and epichlorohydrin are dissolved in toluol to give a 70% solution. To this solution, in the course of 3 hours, at from 30° C. to a maximum of 40° C., a blend of 400 parts toluol and 258 parts (2 moles) 2-ethylhexylamine is added and the reaction is continued at 40° to 50° C. to an epoxy value of practically zero.

(c) Linking Reaction 3200 parts of component (A) are condensed with 2015 parts of component (B) and 66 parts (2 moles) of paraformaldehyde (91% $CH_2O$) at a rising temperature of between 80° to 130° C. with azeotropic entrainment of the reaction water. After attaining the theoretical quantity of water, the entraining agent is substantially vacuum-stripped and the batch is diluted with ethoxypropanol to a solids content of 70%.

(d) Etherification Of The Phenolic Hydroxy Groups

To the intermediate product obtained according to (c), 736 parts (4 moles) dodecene oxide are added and the reaction is carried on at from 90° to 100° C. until the epoxy compound has reacted completely. After addition of 40 milliMoles of acetic acid per 100 g resin solids, the product is readily dilutable with water.

(e) Processing And Testing

In known manner a paint was prepared by blending 70 parts of binder (d) (100% solids) with 83 parts of a pigment paste containing, per 100 parts of resin solids, 1 part carbon black, 12 parts basic lead silicate, and 147 parts titanium dioxide. The paint was neutralized and diluted with deionized water to a solids content of 17%. The paint was electrodeposited on zinc-phosphated steel panels wired as the cathode of an electrodeposition system, and cured for 25 minutes at 160° C. At a dry film thickness of 22 μm, the panels, after 1600 hours of salt spray, ASTM-B-117-64 exposure, show rusting at the cross-incision at a maximum of 2 mm. In the scab-test after 40 cycles (1 cycle equals 4 hours of salt spray plus 4 hours of dry storage plus 16 hours of humidity chamber), rusting is less than 2 mm.

EXAMPLE 2

(a) Component (A)

As described in Example 1, 150 parts (1 mole) of p-tert.-butylphenol are condensed with 130 parts (1 mole) N,N-diethylaminopropylamine and 33 parts (1 mole) paraformaldehyde (91% $CH_2O$) in the presence of 135 parts toluol with entrainment of the reaction water which is formed. As soon as the formation of reaction water had ended, the batch is cooled to 50° C. At a maximum of 60° C., 304 parts (1 mole) of toluylene diisocyanate, semi-blocked with 2-ethylhexanol, are added and the reaction is carried to an NCO-value of zero.

(b) Component (B)

As described in Example 1(b), 380 parts (1 mole) of a bisphenol-A/epichlorohydrin diepoxy resin, 80% in toluol, are reacted with 146 parts (2 moles) of monoisopropanolamine.

(c) Linking Reaction 732 parts of component (A) are condensed as described in Example 1(c) with 311 parts of component (B) and 33 parts (1 mole) of paraformaldehyde (91% $CH_2O$). After stripping the toluol, the batch is diluted with diethyleneglycoldimethylether to a solids content of 70%.

(d) Etherification Of The Phenolic Hydroxy Groups

The batch obtained in step (c) is reacted at 110° to 120° C. with 95 parts (0.25 moles) of a bisphenol-A/epichlorohydrin diepoxy resin and 93 parts (0.5 moles) of 2-ethylhexylglycidylether until all epoxy groups have reacted. After addition of 35 milliMoles of formic acid per 100 g resin solids, the product is readily dilutable with water.

(e) Process And Testing

According to the preparation of Example 1(e), an electrodeposition paint is prepared. The panels are cured for 25 minutes at 170° C. After salt spray exposure of 2000 hours, the maximum rusting is 2 mm. In the scab-test, 60 cycles is obtained.

EXAMPLE 3

(a) Component (A)

In a suitable reaction vessel 129 parts (1 mole) of 2-ethylhexylamine and 304 parts (1 mole) of toluylene diisocyanate, semi-blocked with 2-ethylhexanol, are reacted at from 30° to 50° C. with cooling in the presence of 186 parts toluol. At the end of the addition of the isocyanate, all isocyanate groups have reacted.

The batch is mixed with 47 parts (0.5 moles) of phenol, 100%, and 33 parts (1 mole) paraformaldehyde, 91%, and, with a rising temperature of between 80° C. and 130° C., the reaction water is entrained azeotropically. The toluol is vacuum-stripped and replaced by the same quantity of methoxypropanol.

(b) Component (B)

700 parts of a liquid polybutadiene oil having about 75% 1,4-cis-, about 24% 1,4-trans-configuration, and about 1% vinyl double bonds and a molecular weight of 1500±15%, are reacted completely in known manner in the presence of 0.05 parts diphenylparaphenylenediamine (inhibitor) at 200° C. with 100 parts maleic acid anhydride. After cooling the adduct is reacted with 130 parts 2-ethylhexanol at 120° C. to form the semi-ester. 110 parts of this semi-ester (corresponding to about 0.12 moles COOH-groups) are reacted at 120° C. with 212 parts of a bisphenol-A/epichlorohydrin diepoxy resin (epoxy equivalent weight about 190), 80%, in diethyleneglycol dimethylether, to an acid value of practically zero. After addition of a further 108 parts of diethyleneglycol dimethylether, 59 parts (0.45 moles) N,N-diethylaminopropylamine and 59 parts (0.45 moles) 2-ethylhexylamine, the batch is reacted at 65° to 70° C. to an epoxy value of practically zero.

(c) Linking Reaction 1356 parts of component (A), a quantity corresponding to one formaldehyde-reactive site on the phenol, 629 parts of component (B), a quantity containing about 0.9 moles of NH-groups, and 33 parts (1 mole) of paraformaldehyde (91% CH₂O) are reacted at 80° to 100° C. until the content of free formaldehyde has fallen to below 0.3% of the used quantity.

(d) Etherification Of The Phenolic Hydroxy Groups

The solution obtained according to (c) is reacted with 150 parts (1 mole) of phenylglycidylether at 90° to 110° C. to an epoxy value of zero. After addition of 40 milliMoles formic acid per 100 g of resin solids, the product is dilutable with water.

(e) Processing And Testing

According to Example 1(e), an electrodeposition paint is prepared and applied. The panels are cured for 25 minutes at 160° C. and, after 1800 hours of salt spray exposure, the maximum rusting is 2 mm. With the scab-test, 60 cycles can be obtained.

EXAMPLE 4

(a) Component (A)

The intermediate product of Example 1(a) is used.

(b) Component (B)

500 parts (2 moles) of a technical blend of glycidyl esters of 1,1-dimethyl-($C_7$-$C_9$)-alkane carboxylic acids are reacted at 80° to 100° C. with 116 parts (1 mole) of 1,6-hexamethylenediamine until all epoxy groups have reacted.

(c) Linking Reaction 3200 parts component (A) are condensed with 616 parts component (B) and 66 parts (2 moles) paraformaldehyde (91% CH₂O), with a rising temperature of between 80° and 130° C. with the entrainment of the reaction water. Then, the toluol is vacuum-stripped and a solids content of 70% is obtained by adjustment with ethoxypropanol.

(d) Etherification Of The Phenolic Hydroxy Groups

The batch obtained according to (c) is reacted with 558 parts (3 moles) 2-ethylhexylglycidylether and 475 parts (0.5 moles) of a bisphenol-A/epichlorohydrin diepoxy resin at 100° to 105° C. until all epoxy groups have reacted. After addition of 35 milliMoles of acetic acid per 100 g of resin solids the product is dilutable with water.

(e) Processing And Testing

According to Example 1(e), an electrodeposition paint is prepared and applied. The panels are cured for 25 minutes at 155° C. After 1800 hours of salt spray exposure, the maximum rusting is 2 mm. In the scab-test, 60 cycles can be obtained.

As will be apparent to one skilled in the art, various modifications can be made within the scope of the aforesaid description. Such modifications being within the ability of one skilled in the art form a part of the present invention and are embraced by the appended claims.

It is claimed:

1. Process for producing self-crosslinking cationic paint binders, water-dilutable upon protonation based on aminoalkylation products carrying blocked isocyanate groups, of phenols and epoxy resins, characterized in that a condensate of the formula

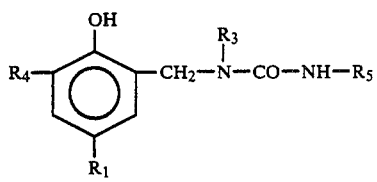

wherein
R₁ is a hydrogen atom, an alkyl radical, a radical

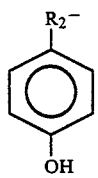

or a radical

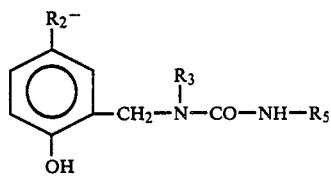

or

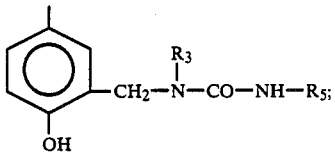

R₂ is a radical —CH₂—, or

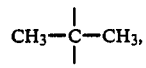

R₃ is an alkyl, hydroxyalkyl or tert.-aminoalkyl radical,
R₄ is a hydrogen atom, or, where R₁ is H, is hydrogen or a radical —CH₂—N(R₃)—CO—NH—R₅ and
R₅ is the radical or moiety of a diisocyanate, semi-blocked with a monofunctional compound,
is reacted at from 80° to 130° C. with from 0.3 to 1.0 moles of formaldehyde, calculated on the formaldehyde-reactive sites of the phenol nuclei of the condensate, and with a compound carrying at least one NH-group, wherein the quantity of NH-groups used is equivalent to the molar quantity of formaldehyde; and in a further reaction step, the phenolic hydroxy groups are partially or totally reacted with epoxy compounds, the quantity of basic groups being chosen in order that the final product has an amine value of at least 25 mg KOH/g.

2. Process according to claim 1 further characterized in that the compound carrying the NH-groups is a disecondary amine.

3. Process according to claim 2 further characterized in that the disecondary amine is an N,N'-dialkylalkylenediamine or an N,N'-dialkylpolyoxyalkylenediamine.

4. Process according to claim 1 further characterized in that the NH-group carrying compound is the reaction product of a polyepoxy compound with a primary amine.

5. Process according to claims 1 to 4 further characterized in that the binders are formulated in order that tertiary amino groups in a quantity corresponding to an amine value of at least 25 mg KOH/g are introduced into the binder through the intermediate condensation product, through the linking reaction, or through a blocking agent for semi-blocking the diisocyanate.

6. A cathodically depositable paint comprising a binder produced according to claim 1.

7. Self-crosslinking cationic paint binders, water-dilutable upon protonation comprising the reaction product of a condensate of the formula

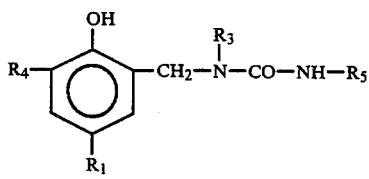

wherein $R_1$ is a hydrogen atom, an alkyl radical, a radical

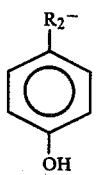

or a radical

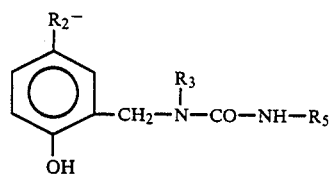

or

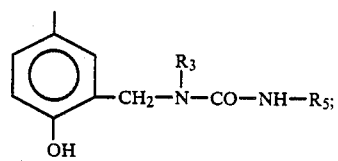

$R_2$ is a radical —$CH_2$—, or

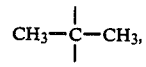

$R_3$ is an alkyl, hydroxyalkyl or tert.-aminoalkyl radical, $R_4$ is a hydrogen atom, or, where $R_1$ is H, is hydrogen or a radical —$CH_2$—$N(R_3)$—CO—NH—$R_5$ and $R_5$ is the radical or moiety of a diisocyanate, semi-blocked with a monofunctional compound, with from 0.3 to 1.0 moles of formaldehyde, calculated on the formaldehyde-reactive sites of the phenol nuclei of said condensate, and with a compound carrying at least one NH-group, wherein the quantity of NH-groups is equivalent to the molar quantity of formaldehyde; and wherein in a further reaction, the phenolic hydroxy groups are partially or totally reacted with epoxy compounds, the quantity of basic groups being chosen in order that the final product has an amine value of at least 25 mg KOH/g.

8. Binder according to claim 7 wherein the compound carrying the NH-groups is a disecondary amine.

9. Binder according to claim 8 wherein the disecondary amine is an N,N'-dialkylalkylenediamine or an N,N'-dialkylpolyoxyalkylenediamine.

10. Binder according to claim 7 wherein the NH-group carrying compound is the reaction product of a polyepoxy compound with a primary amine.

* * * * *